United States Patent
Yamanaka et al.

(10) Patent No.: US 7,114,322 B2
(45) Date of Patent: Oct. 3, 2006

(54) GAS-TURBINE POWER GENERATING INSTALLATION AND METHOD OF OPERATING THE SAME

(75) Inventors: Kazunori Yamanaka, Hitachi (JP); Shinya Marushima, Hitachinaka (JP); Hisashi Hamatake, Hitachi (JP); Mutsumi Horitsugi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/917,285

(22) Filed: Aug. 13, 2004

(65) Prior Publication Data

US 2005/0091985 A1    May 5, 2005

(30) Foreign Application Priority Data

Oct. 30, 2003    (JP)    ............................ 2003-370324

(51) Int. Cl.
F02C 3/22    (2006.01)
(52) U.S. Cl. .................................. 60/39.465
(58) Field of Classification Search ................ 60/772, 60/722, 726, 805, 39.465
See application file for complete search history.

(56) References Cited

U.S. PATENT DOCUMENTS

| | | | | |
|---|---|---|---|---|
| 4,380,897 A * | 4/1983 | Zaba | ............................ | 60/802 |
| 5,685,154 A * | 11/1997 | Bronicki et al. | ............... | 60/648 |
| 5,685,155 A * | 11/1997 | Brown et al. | ................. | 60/698 |
| 6,779,333 B1 * | 8/2004 | Gerhold | ....................... | 60/39.53 |
| 6,928,821 B1 * | 8/2005 | Gerhold | ........................ | 60/775 |
| 2003/0131582 A1 * | 7/2003 | Anderson et al. | ........... | 60/39.55 |
| 2004/0226299 A1 * | 11/2004 | Drnevich | ...................... | 60/772 |
| 2005/0011179 A1 * | 1/2005 | Ooka et al. | .............. | 60/39.182 |
| 2005/0050894 A1 * | 3/2005 | Ahmed et al. | ................. | 60/722 |
| 2005/0072164 A1 * | 4/2005 | MacKay | ....................... | 60/805 |
| 2005/0091986 A1 * | 5/2005 | Gerhold | ....................... | 60/775 |
| 2005/0126156 A1 * | 6/2005 | Anderson et al. | ........... | 60/39.12 |

FOREIGN PATENT DOCUMENTS

JP    2002-327629    11/2002
JP    2003-166428    6/2003

* cited by examiner

*Primary Examiner*—William H. Rodriguez
(74) *Attorney, Agent, or Firm*—Mattingly, Stanger, Malur & Brundidge, P.C.

(57)    ABSTRACT

A gas-turbine power generating installation capable of effectively utilizing gases produced in overage gas fields, etc. and a method of operating the installation are provided. The gas-turbine power generating installation is installed in the vicinity of an outrage gas field or an oil field. In the installation, air compressed by a compressor is introduced to a combustor for combustion after being mixed with fuel, a gas turbine is driven by generated combustion gas, and a power generator is driven by motive power obtained from a rotary shaft of the gas turbine. A boosting compressor is driven by the motive power obtained from the rotary shaft of the gas turbine, whereby natural gas or accompanying gas is boosted in pressure and supplied as fuel to the combustor. The gas turbine generates electric power by using natural gas produced in the outrage gas field or accompanying gas produced in the oil field, and the generated electric power is supplied to a consuming site.

8 Claims, 8 Drawing Sheets

GAS-TURBINE POWER GENERATING INSTALLATION AND METHOD OF OPERATING THE SAME

BACKGROUND OF THE INVENTION

1. Field of the Invention

The present invention relates to a gas-turbine power generating installation and a method of operating the gas-turbine power generating installation. More particularly, the present invention relates to a gas-turbine power generating installation capable of employing gases produced in overage gas fields, etc., such as natural gas extracted from the overage gas fields at reduced outturn and low pressure, and accompanying gas produced at low pressure during oil extraction in oil fields, and also to a method of operating the gas-turbine power generating installation.

2. Description of the Related Art

In view of environment pollution in worldwide scale, regulations on exhaust gas from various engines have been urged in progress. Under such situations, natural gas is worthy of note as fuel giving less influence upon environments.

Figure 1:
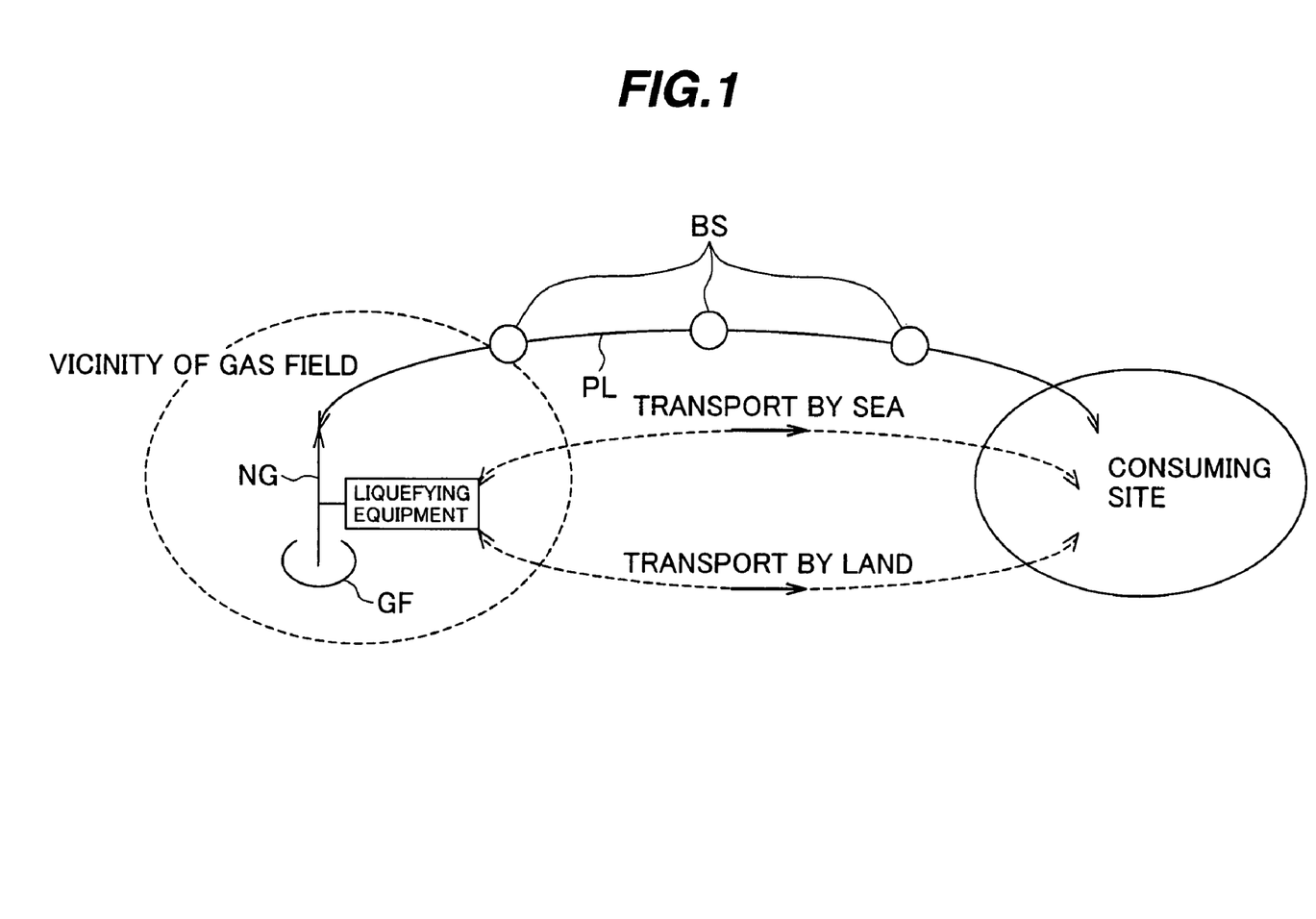
FIG. 1 is an illustration for explaining conventional methods of utilizing natural gas.

Natural gas NG is transported from a gas field GF to a consuming site, as shown in FIG. 1, by a method of liquefying the natural gas with liquefying equipment in the gas field and transporting the liquefied gas to the consuming site by land or sea, or a method of transporting the natural gas, as it is, to the consuming site through a pipeline PL. The pipeline includes several booster stations BS for boosting the pressure of natural gas to compensate for a pressure loss caused as the natural gas flows through the pipeline. The interval between the booster stations BS is, e.g., several tens to several hundreds kilometers. General constructions of known gas-turbine power generating installations are disclosed in, e.g., JP-A-2003-166428 and JP-A-2002-327629.

SUMMARY OF THE INVENTION

However, when natural gas fields become overage with the progress of gas extraction, outturn is reduced and a profit is no longer expected because of a relative increase of the cost for liquefying and transporting the natural gas or for transporting the natural gas through the pipeline. For that reason, it has been usual in the past that the natural gas extracted from those overage gas fields is not transported to a consuming site and hence not effectively utilized.

Further, in oil fields, accompanying gas is produced concurrently during oil extraction, but such gas has also not been effectively utilized in the past.

Accordingly, it is an object of the present invention to provide a gas-turbine power generating installation capable of employing gases produced in overage gas fields, etc., such as natural gas extracted from the overage gas fields and accompanying gas produced in oil fields, and to a method of operating the gas-turbine power generating installation.

(1) To achieve the above object, the present invention provides a gas-turbine power generating installation including a gas turbine installed in the vicinity of an outrage gas field or an oil field and generating electric power with the gas turbine by using natural gas produced in the outrage gas field or accompanying gas produced in the oil field, the generated electric power being supplied to a consuming site, wherein the gas turbine is a gas turbine in which air compressed by a compressor is introduced to a combustor for combustion after being mixed with fuel, a turbine is driven by generated combustion gas, and a power generator is driven by motive power obtained from a rotary shaft of the gas turbine, the installation further includes a boosting compressor driven by the motive power obtained from the rotary shaft of the gas turbine, and the natural gas or the accompanying gas is boosted in pressure by the boosting compressor and supplied as fuel to the combustor.

With that arrangement, gases produced in outrage gas fields, etc. can be effectively utilized.

(2) In above (1), preferably, the power generator is driven by the rotary shaft of the gas turbine through a speed reducing gear, and the boosting compressor is driven by the rotary shaft of the gas turbine through a speed increasing gear.

(3) In above (2), preferably, the speed reducing gear and the speed increasing gear receive the motive power from the shaft of the gas turbine on the compressor side.

(4) In above (1), preferably, the gas-turbine power generating installation further includes a fuel flow adjusting valve disposed in a line extending from an outlet of the boosting compressor to the combustor in the gas turbine; a tank; a line connecting an intermediate point between the outlet of the boosting compressor and the fuel flow adjusting valve to the tank; and an on/off valve disposed in the line connected to the tank.

(5) In above (1), preferably, the gas-turbine power generating installation further includes an air line extending from an outlet or an intermediate position of the compressor in the gas turbine to an inlet of the boosting compressor; an air supply valve disposed in the air line; and a switching valve disposed on the inlet side of the boosting compressor upstream of a joint position of the air line.

(6) In above (1), preferably, the gas-turbine power generating installation further includes a bypass line connecting an inlet and an outlet of the boosting compressor in the gas turbine; a startup fuel gas supply valve disposed in the bypass line; and pressure gauges for measuring an inlet pressure and an outlet pressure of the boosting compressor.

(7) In above (1), preferably, the gas-turbine power generating installation further includes a bypass line connecting an inlet and an outlet of the boosting compressor in the gas turbine; a startup fuel gas supply valve disposed in the bypass line; and a tachometer for detecting a rotation speed of a shaft of the boosting compressor, the turbine or the power generator.

(8) In above (1), preferably, the gas-turbine power generating installation further includes a bypass line connecting an inlet and an outlet of the boosting compressor in the gas turbine; and a startup fuel gas boosting compressor and a startup fuel gas supply valve both disposed in the bypass line.

(9) In above (1), preferably, the gas-turbine power generating installation further includes an anti-surge line extending to an inlet of the boosting compressor from an intermediate point of a line extending from an outlet of the boosting compressor to the combustor in the gas turbine; and an anti-surge valve disposed in the anti-surge line.

(10) To achieve the above object, the present invention also provides a gas-turbine power generating installation comprising a gas turbine installed in the vicinity of an outrage gas field or an oil field and including a first compressor for compressing air, a combustor for generating combustion gas from fuel and the air compressed by the first compressor, and a turbine driven by the combustion gas; a power generator driven by motive power from a rotary shaft of the gas turbine; a second compressor driven by motive power from the rotary shaft of the gas turbine; and a fuel supply line for compressing natural gas produced in the outrage gas field or accompanying gas produced in the oil field by the second compressor and supplying the compressed gas, as fuel, to the combustor.

With that arrangement, gases produced in outrage gas fields, etc. can be effectively utilized.

(11) To achieve the above object, the present invention further provides a method of operating a gas-turbine power generating installation, the method comprising the steps of installing a gas turbine in the vicinity of an outrage gas field or an oil field, the gas turbine including a first compressor for compressing air, a combustor for generating combustion gas from fuel and the air compressed by the first compressor, and a turbine driven by the combustion gas; driving a power generator by motive power from a rotary shaft of the gas turbine; driving a second compressor by motive power from the rotary shaft of the gas turbine; and compressing natural gas produced in the outrage gas field or accompanying gas produced in the oil field by the second compressor and supplying the compressed gas, as fuel, to the combustor.

With that method, gases produced in outrage gas fields, etc. can be effectively utilized.

(12) To achieve the above object, the present invention still further provides a method of operating a gas-turbine power generating installation installed in the vicinity of an outrage gas field or an oil field, the method comprising the steps of supplying, as fuel, natural gas produced in the outrage gas field or accompanying gas produced in the oil field to a combustor of the gas-turbine power generating installation; and generating electric power within a distance of 20 km from the outrage gas field or the oil field with a power generator having a capacity of 10000 to 100000 kw and driven by motive power from a rotary shaft of the gas turbine.

With that method, gases produced in outrage gas fields, etc. can be effectively utilized.

(13) To achieve the above object, the present invention still further provides a method of operating a gas-turbine power generating installation installed in the vicinity of an outrage gas field or an oil field, the method comprising the steps of compressing natural gas produced in the outrage gas field or accompanying gas produced in the oil field to a desired pressure by a gas compressing unit which is driven by motive power from a rotary shaft of a gas turbine in the gas-turbine power generating installation, and supplying the compressed gas, as fuel, to a combustor of the gas-turbine power generating installation; and generating electric power with a power generator driven by motive power from a rotary shaft of the gas turbine.

With that method, gases produced in outrage gas fields, etc. can be effectively utilized.

According to the present invention, it is possible to effectively utilize gases produced in outrage gas fields, etc.

DESCRIPTION OF THE PREFERRED EMBODIMENTS

A gas-turbine power generating installation employing gases produced in overage gas fields, etc. and a method of operating the installation, according to a first embodiment of the present invention, will be described below with reference to FIGS. 2 to 5. Note that the following description is made, by way of example, in connection with natural gas produced in overage gas fields.

First, the basic concept of a method of effectively utilizing natural gas with the gas-turbine power generating installation according to this embodiment will be described with reference to FIG. 2.

Figure 2:
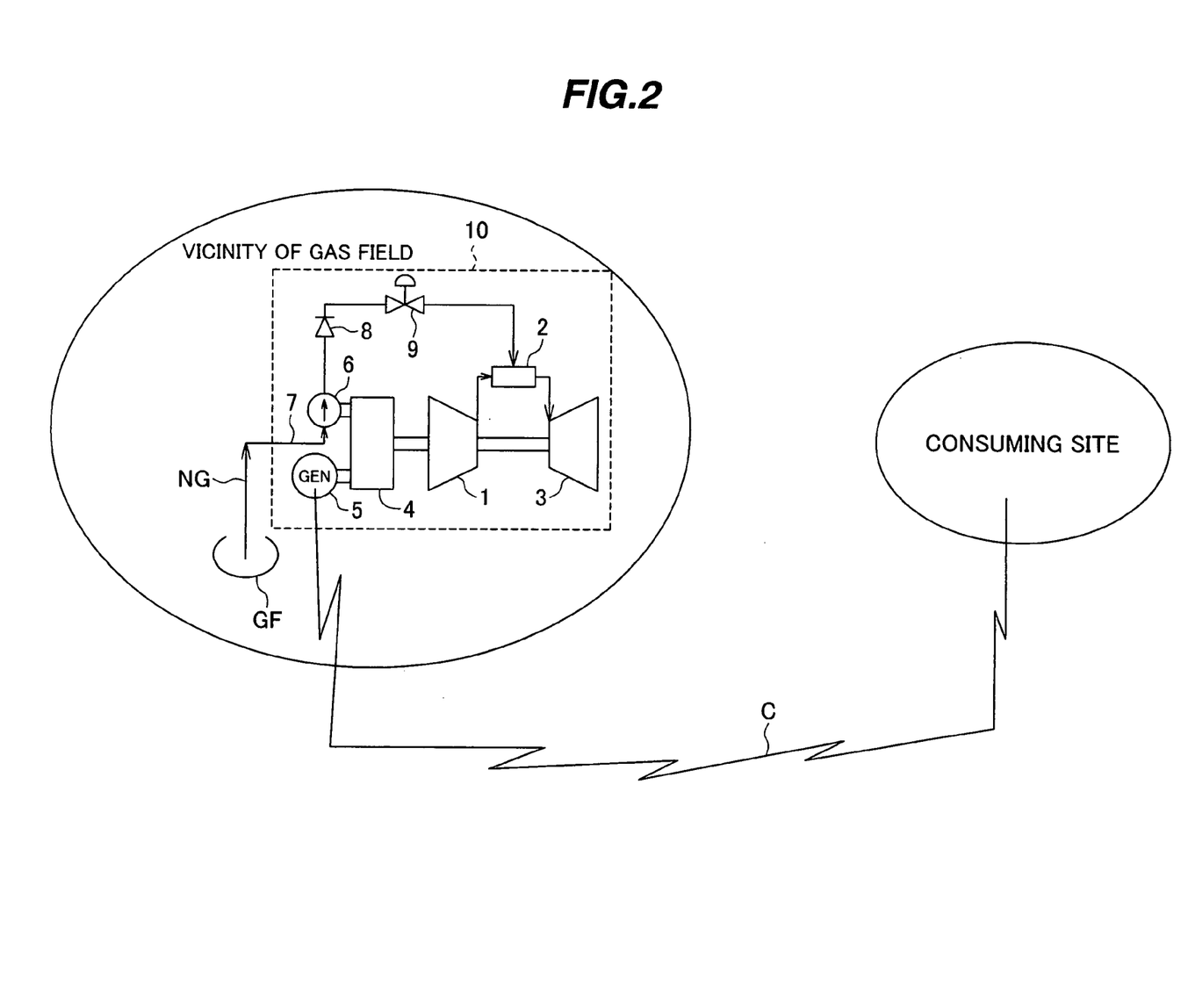
FIG. 2 is a conceptual view showing a method of effectively utilizing natural gas with a gas-turbine power generating installation according to a first embodiment of the present invention.

FIG. 2 is a conceptual view showing the method of effectively utilizing natural gas with the gas-turbine power generating installation according to the first embodiment of the present invention.

A first feature of the present invention resides in that a gas-turbine power generating installation 10 is installed in the vicinity of an overage gas field GF producing natural gas. Generally, in overage gas fields, natural gas is produced not only at reduced outturn, but also at low pressure. To effectively utilize such natural gas produced in small quantity and at low pressure, the gas-turbine power generating installation 10 is installed in the vicinity of the overage gas field. Because the gas-turbine power generating installation 10 requires a relatively low equipment cost and can convert the natural gas into fuel at high efficiency, it is suitable as an installation for effectively utilizing the natural gas.

The gas-turbine power generating installation 10 comprises a gas turbine compressor 1, a combustor 2, a turbine 3, a transmission 4, and a power generator 5. In the present invention, the gas-turbine power generating installation 10 is installed in the vicinity of the gas field GF producing natural gas NG, and the natural gas NG extracted from the gas field GF is introduced through a fuel gas supply line 7 as fuel for driving a turbine 3, thereby to generate electric power. The generated electric power is supplied to the consuming site via a cable C. The place where the generated electric power is consumed is not limited to an area outside the overage gas field, and the generated electric power may be consumed within the site of the overage gas field if there is a demand.

The gas-turbine power generating installation 10 is ideally installed right above the outrage gas field GF, but it is often difficult to install the installation 10 right above the outrage gas field due to conditions of location, etc. In such a case, the natural gas must be supplied to the gas-turbine power generating installation 10 through a pipe. If the distance from the gas field GF increases, the overall length of the pipe also increases, which not only pushes up the pipe laying cost, but also increases a pressure loss in the pipe. For that reason, the term "the vicinity of the overage gas field GF" means the distance within which the natural gas extracted from the overage gas field can be supplied to the gas-turbine power generating installation 10 for operation of the gas turbine in a satisfactory way. In practice, the vicinity of the overage gas field GF means the distance within about 20 km, preferably about 10 km, from the gas field GF.

A second feature of the present invention resides in that a (fuel gas) boosting compressor 6 is provided and driven by motive power obtained from a rotary shaft of the turbine 3 of the gas-turbine power generating installation 10. The pressure of the natural gas extracted from the outrage gas field is low. On the other hand, the pressure of fuel supplied to the combustor 2 of the gas turbine 3 must be higher than the pressure of burning air boosted up by the gas turbine compressor 1 and supplied to the combustor 2. In view of that condition, this embodiment employs the boosting compressor 6 for realizing utilization of the low-pressure gas. Then, the boosting compressor 6 is driven by the motive power obtained from the rotary shaft of the turbine 3 after a speed shift through the transmission 4. Accordingly, a new driving source, such as a motor, is not required. The natural gas at pressure boosted by the boosting compressor 6 is supplied to the combustor 2 through a check valve 8 and a fuel flow adjusting valve 9.

The construction of the gas-turbine power generating installation according to this embodiment will be described below with reference to FIG. 3.

Figure 3:
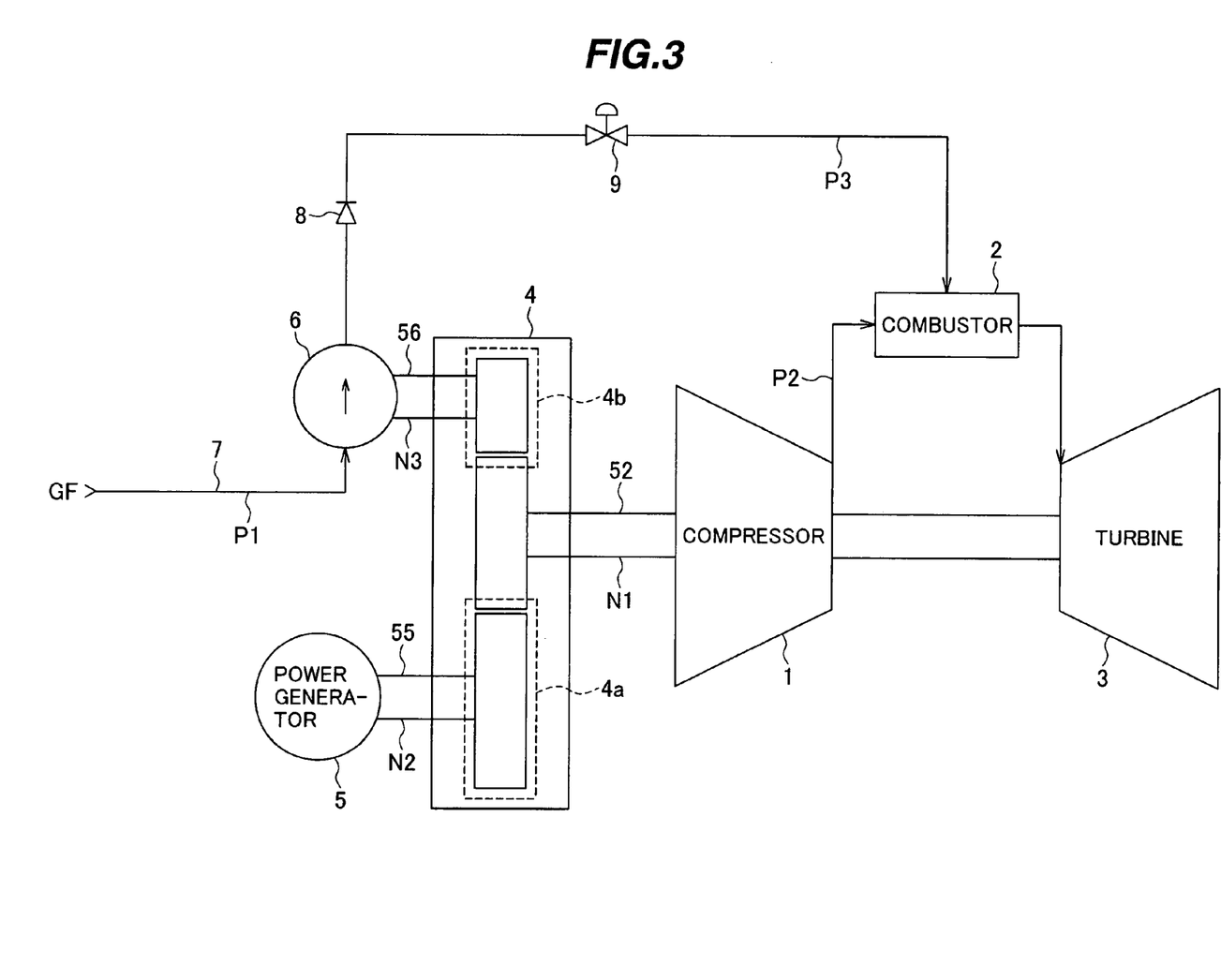
FIG. 3 is a system diagram of the gas-turbine power generating installation according to the first embodiment of the present invention.

FIG. 3 is a system diagram of the gas-turbine power generating installation according to the first embodiment of the present invention. Note that, in FIG. 3, the same symbols as those in FIG. 2 denote the same components.

Fuel gas supplied to the gas turbine is burnt in the combustor 2 with burning air supplied from the gas turbine compressor 1, and the turbine 3 is driven by combustion gas from the combustor 1. The motive power obtained by the turbine 3 is used to drive the power generator 5 through the transmission 4, thereby generating electric power. The pressure of natural gas extracted from the outrage gas field is so low as not to be employed directly as fuel for the gas turbine, and therefore must be boosted. To this end, the boosting compressor 6 is driven by torque outputted from the transmission 4 of the power generator 5 to boost the fuel pressure to such an extent that the fuel can be supplied to the combustor 2 through the check valve 8 and the fuel flow adjusting valve 9.

Here, a description is made of pressures in a general gas turbine. Usually, a pressure P1 of natural gas extracted from an outrage gas field is, e.g., lower than 10 ata. When outturn reduces and the pressure of the natural gas lowers, the extracted natural gas can no longer be supplied to a consuming site through a pipeline as having been practiced so far, and it is difficult to ensure a profit necessary from the viewpoints of maintaining pipeline equipment and obtaining satisfactory cost effectiveness. In addition, the method of liquefying and transporting the extracted natural gas also faces a difficulty in ensuring a profit necessary from the viewpoints of maintaining the liquefying and transporting equipment and obtaining satisfactory cost effectiveness.

On the other hand, because the gas turbine compressor 1 usually has a pressure ratio in the range of 10 to 20, a pressure P2 of the burning air is in the range of 10 to 20 ata. Therefore, if the pressures P1 and P2 remain at the respective levels, the natural gas cannot be supplied to the gas turbine combustor 2 because of improper pressure balance. To obtain proper pressure balance, the boosting compressor 6 is driven by torque transmitted from the shaft end of the compressor 1 through the transmission 4 for driving the power generator 5, whereby the natural gas extracted from the outrage gas field is supplied to the combustor 2 after the pressure thereof has been boosted to a pressure P3, e.g., 20 to 30 ata, that is required for the fuel supplied to the gas turbine combustor 2. Taking into account a pressure loss in the combustor 2, the pressure P3 of the natural gas serving as fuel is set to a level of 20 to 30 ata higher than the burning air pressure P2 (10 to 20 ata). With the arrangement of transmitting the driving force from the gas turbine shaft to the boosting compressor 6 through the transmission 4, the boosting compressor 6 can be constructed as a part of the gas turbine and the overall installation can be made compact. Further, utilizing the shaft torque of the gas turbine for driving the boosting compressor 6 is able to achieve a smaller loss and higher efficiency as compared with the case of employing, instead of the shaft torque of the gas turbine, a separate motor (not shown) to drive the boosting compressor 6. Thus, it is possible to effectively utilize the natural gas that is produced in small quantity and at low pressure and hence has not been utilized in the past, by installing the gas turbine provided with the shaft-driven boosting compressor 6 as its integral part in the vicinity of the overage gas field, generating electric power, and supplying the generated electric power to the consuming site.

Next, the shaft arrangement for driving the boosting compressor 6 will be described below. The transmission 4 is not connected to the shaft end of the turbine 3 side, but it is connected to the shaft end of the compressor 1 side. The reason is that, because the temperature on the compressor 1 side is lower than that on the turbine 3 side, thermal elongation is smaller and clearances to be left in consideration of thermal deformations can be set to smaller values on the compressor 1 side. The power generator 5 and the boosting compressor 6 are connected to the transmission 4.

A gas turbine suitable for the overage gas field is a medium-sized gas turbine with output power of 10000 to 100000 kw, taking into account the quantity of extracted gas. A rotation speed N1 of the medium-sized gas turbine is generally designed to be higher than a rotation speed N2 (3600 rpm (corresponding to 60 Hz) or 3000 rpm (corresponding to 50 Hz)) of the power generator. In the case of a gas turbine with output power of 20000 to 30000 kw, for example, the rotation speed N1 of the compressor shaft end is about 7200 rpm. Therefore, the motive power of the compressor shaft is transmitted through a speed reducing gear 4a with a speed reducing ratio of 2 to 2.4 to the power generator 5 for supplying electric power to the consuming site. Te medium-sized gas turbine with output power of 10000 to 100000 kw can be designed as a compact installation and hence can be relatively easily installed in the vicinity of the drilling site. Further, by installing that type of gas turbine, for example, in the outrage gas field where outturn is reduced or the gas field where natural gas is produced in small quantity, it is possible to realize power generation appropriately adapted for the quantity of produced gas, and to provide a power generating system with good economy.

The rotation speed N3 of the boosting compressor 6 for boosting the fuel pressure is desirably set to a relatively high level of 20000 to 30000 rpm, taking into account a smaller gas flow rate than that in the compressor 1 and a more compact size. For that reason, the boosting compressor 6 for boosting the lower pressure of the extracted gas to a level required as the fuel for the gas turbine combustor is supplied with the motive power through a speed increasing gear 4b with a speed increasing ratio of about 3 to 4.

As described above, the transmission 4 comprises the speed reducing gear 4a for transmitting the motive power to the power generator 5 and the speed increasing gear 4b for transmitting the motive power to the boosting compressor 6. With such an arrangement, since not only the rotation speed of the power generator 5, but also the rotation speed of the boosting compressor 6 are mechanically decided with control of the rotation speed of the gas turbine, the boosting compressor 6 can be operated with high efficiency. Further, while associated equipment, such as a motor, and an installation space for the associated equipment are required in the case of driving the boosting compressor 6 separately, those disadvantages are eliminated because the boosting compressor 6 is constructed as an integral part of the gas turbine. As a result, a compact structure can be realized in addition to the high efficiency described above.

The construction of the gas-turbine power generating installation according to this embodiment will be described in more detail below with reference to FIGS. 4 and 5.

Figure 4:
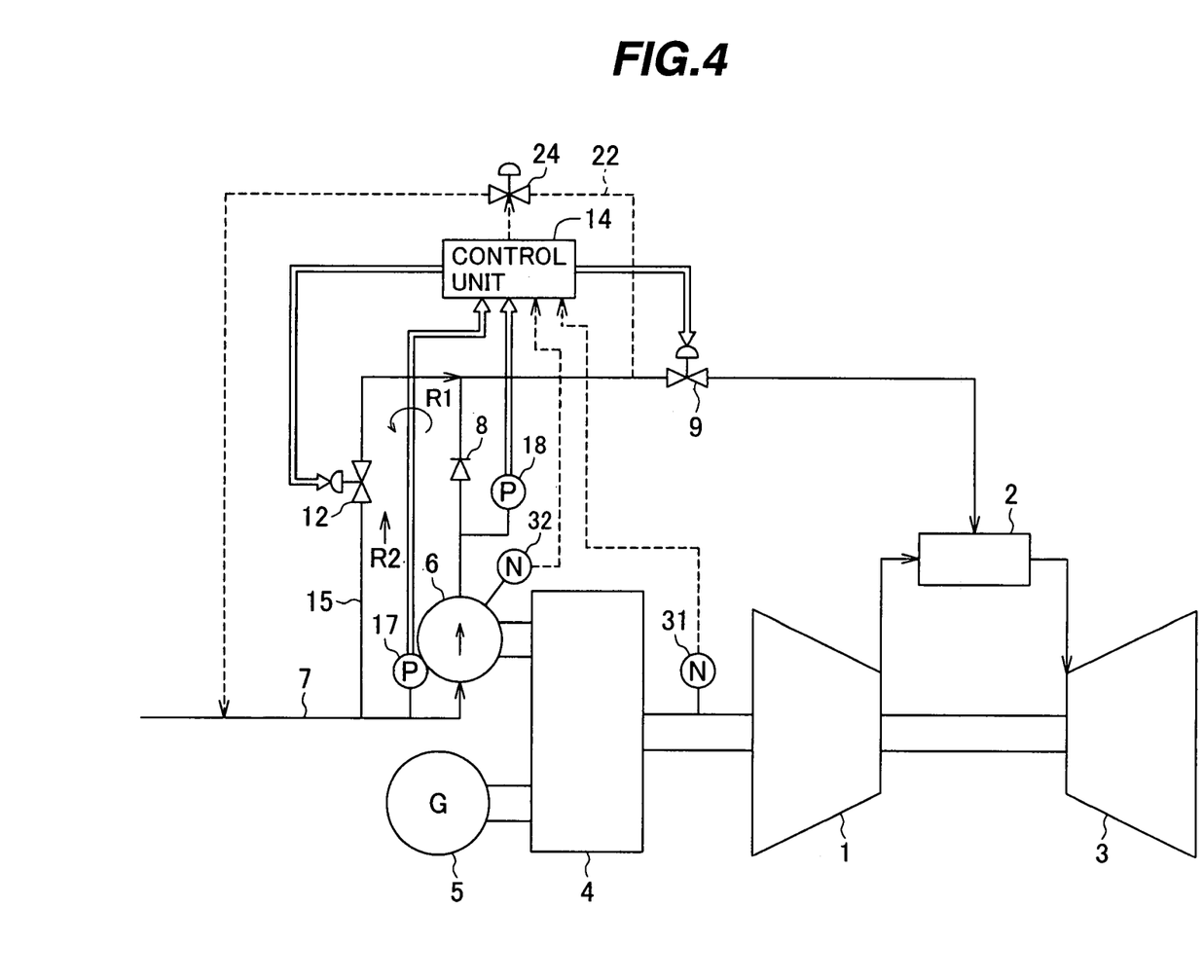
FIG. 4 is a more detailed system diagram of the gas-turbine power generating installation according to the first embodiment of the present invention.
Figure 5:
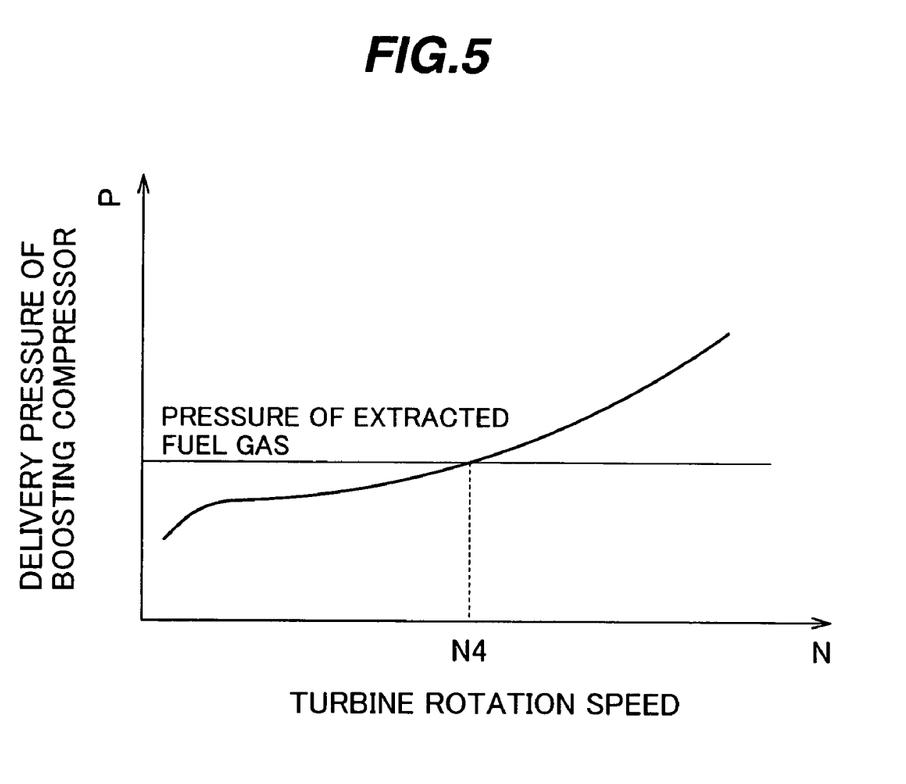
FIG. 5 is a graph for explaining the delivery pressure of a boosting compressor used in the gas-turbine power generating installation according to the first embodiment of the present invention.

FIG. 4 is a more detailed system diagram of the gas-turbine power generating installation according to the first embodiment of the present invention, and FIG. 5 is a graph for explaining the delivery pressure of the boosting compressor used in the gas-turbine power generating installation according to the first embodiment of the present invention. Note that, in FIG. 4, the same symbols as those in FIG. 2 denote the same components.

The construction shown in FIG. 4 includes, in addition to the components shown in FIG. 3, a control unit 14 for controlling the fuel flow adjusting valve 9, a startup fuel supply valve 12, and an anti-surge valve 24 in accordance with pressures detected by pressure gauges 17, 18 and the operation status of the gas turbine.

The startup fuel supply valve 12 is disposed in a bypass line 15 that extends in parallel to a line where the boosting compressor 6 and the check valve 8 are connected in series. In the startup stage in which the rotation speed of the gas turbine is low, the startup fuel supply valve 12 is opened so that the natural gas serving as fuel is supplied to the combustor 2 via the bypass line 15.

A description is now made of the delivery pressure of the boosting compressor 6 with reference to FIG. 5. In the graph of FIG. 5, the horizontal axis represents the rotation speed of the turbine 3, and the vertical axis represents the delivery pressure of the boosting compressor 6. As seen from FIG. 5, in the startup stage in which the rotation speed of the gas turbine is low, the rotation speed of the boosting compressor 6 is also low and a pressure loss is caused in excess of the boosting effect developed by the boosting compressor 6 because the boosting compressor 6 itself acts as a resistance member. Therefore, the delivery pressure of the boosting compressor 6 may be often lower than the pressure of the extracted fuel gas. In such a case, there is a possibility that the fuel pressure is not sufficiently boosted and the required amount of fuel cannot be supplied to the combustor 2. In view of such a possibility, as shown in FIG. 4, the bypass line 15 is provided to supply the fuel gas to the combustor 2 while bypassing the boosting compressor 6. During a period of the low-pressure operation at the startup from the ignition rotation speed until the delivery pressure of the boosting compressor 6 rises up to a certain level, the control unit 14 opens the startup fuel supply valve 12 so that the fuel is supplied via the bypass line 15. Thus, the bypass line 15 for the startup is used during a period until the rotation speed of the turbine increases and the delivery pressure of the boosting compressor 6 rises up to the certain level. After the delivery pressure of the boosting compressor 6 has risen up to the certain level, the control unit 14 closes the startup fuel supply valve 12 to stop the fuel supply via the bypass line 15 so that the fuel is supplied to the combustor 2 only through the boosting compressor 6.

In practice, the control unit 14 compares the delivery pressure of the boosting compressor 6 detected by the pressure gauge 18 after pressure boosting of the fuel gas with the pressure of the fuel gas extracted from the gas field, which is detected by the pressure gauge 17, and then closes the startup fuel supply valve 12, i.e., sets its opening degree to zero, when the delivery pressure of the boosting compressor 6 becomes higher than the pressure of the extracted fuel gas.

Instead of the above-described method using the pressure gauges 17 and 18, similar control can also be made by using a turbine tachometer 31 for detecting the rotation speed of the turbine 3 and a compressor tachometer 32 for detecting the rotation speed of the boosting compressor 6. More specifically, in the trial operation of the power generating installation, a characteristic of the delivery pressures of the boosting compressor 6 and the gas turbine compressor 1 versus the rotation speed of the turbine is measured to obtain a characteristic curve similar to that shown in FIG. 5. Then, the control unit 14 opens the startup fuel supply valve 12 when the turbine rotation speed measured by the tachometer 31 is lower than a rotation speed N4 shown in FIG. 5, i.e., when the delivery pressure of the boosting compressor 6 is lower than the pressure of the extracted fuel gas, and it closes the startup fuel supply valve 12 when the turbine rotation speed exceeds above the rotation speed N4. Because the turbine rotation speed is decided depending on the rotation speed of the boosting compressor 6 detected by the tachometer 32 and a gear ratio of the transmission 4, the opening/closing of the startup fuel supply valve 12 can also be controlled in accordance with the rotation speed of the boosting compressor 6 detected by the tachometer 32. The rotation speed of the power generator can be alternatively used to perform similar control.

A description is now made of the anti-surge valve 24. During the speed increasing stage or the low-load operation of the gas turbine, the flow rate of the fuel supplied to the combustor 2 is smaller than that during the rated operation. Therefore, the operation may come into a surge region depending on pressure and flow rate characteristics of the boosting compressor 6. To prevent the operation of the boosting compressor 6 in the surge region, an anti-surge line 22 is provided for connection between the outlet side and the inlet side of the boosting compressor 6, and the anti-surge valve 24 is disposed midway the anti-surge line 22. The control unit 14 controls the anti-surge valve 24 in accordance with the operation status of the gas turbine to ensure a sufficient flow rate of the fuel by using the anti-surge line 22 so that stable operation can be realized over a full range from the startup to the rated-load operation of the gas turbine.

Further, during a period from the startup of the gas turbine until it reaches the ignition rotation speed, the rotation speed of the gas turbine is increased by a driving motor, and the control unit 14 holds the fuel flow adjusting valve 9 closed. Then, as the rotation speed of the gas turbine increases, the delivery side of the boosting compressor 6 continues to be kept in a shutoff state. To avoid the operation in such a shutoff state, the control unit 14 opens the anti-surge valve 24 during the period from the startup of the gas turbine until it reaches the ignition rotation speed. As an alternative, the shutoff state can also be avoided by opening, instead of the anti-surge valve 24, the startup fuel supply valve 12 and forming a flow passage indicated by an arrow R1 in FIG. 4. In other words, after the delivery pressure of the fuel gas boosting compressor has risen to the certain level through the startup, ignition and speed increasing stages and the fuel supply via the bypass line is stopped, the startup fuel supply valve 12 can be similarly employed as an anti-surge valve. Using the single valve 12 for dual purposes of supplying the startup fuel gas and serving as the anti-surge valve contributes to simplifying the line arrangement around the fuel gas boosting compressor and reducing the cost.

In addition, when the turbine is stopped, the control unit 14 opens the anti-surge valve 24 at the same time as cutoff of the fuel, thereby to prevent the fuel gas boosting compressor from being operated in the shutoff state. This enables the gas turbine to be stopped with safety.

While the above description has been made in connection with, by way of example, the outrage gas field, the gas-turbine power generating installation is also applicable to effectively utilize accompanying gas that is produced in oil fields concurrently during oil drilling.

According to this first embodiment, as described above, even in an especial situation such as an outrage gas field, natural gas produced in the outrage gas field and having been left unused in the past can be effectively utilized by generating electric power with the gas-turbine power generating installation installed in the vicinity of the overage gas field and supplying the generated electric power to the consuming site without employing the pipeline and the liquefying and transporting equipment which have been used so far. By selling the generated electric power, the installation cost of a new power generating installation can be offset and a profit can be obtained. Further, the cost required to repair, manage and maintain the pipeline and the liquefying and transporting equipment can also be cut down.

Moreover, the fuel gas boosting compressor is driven by the motive power transmitted from the gas turbine shaft through the speed increasing gear, the power generator is driven by the motive power transmitted from the gas turbine shaft through the speed reducing gear, and the speed increasing gear and the speed reducing gear are both constructed integrally with the transmission. Therefore, a compact gas turbine adaptable for the outrage gas field can be realized with high reliability and high efficiency. Usually, the existing plant is present in an outrage gas field or an oil field, and the gas-turbine power generating installation is installed there. Since the generating installation has a compact structure, the existing site can be effectively utilized.

The detailed construction of a gas-turbine power generating installation according to a second embodiment of the present invention will be described below with reference to FIG. 6.

Figure 6:
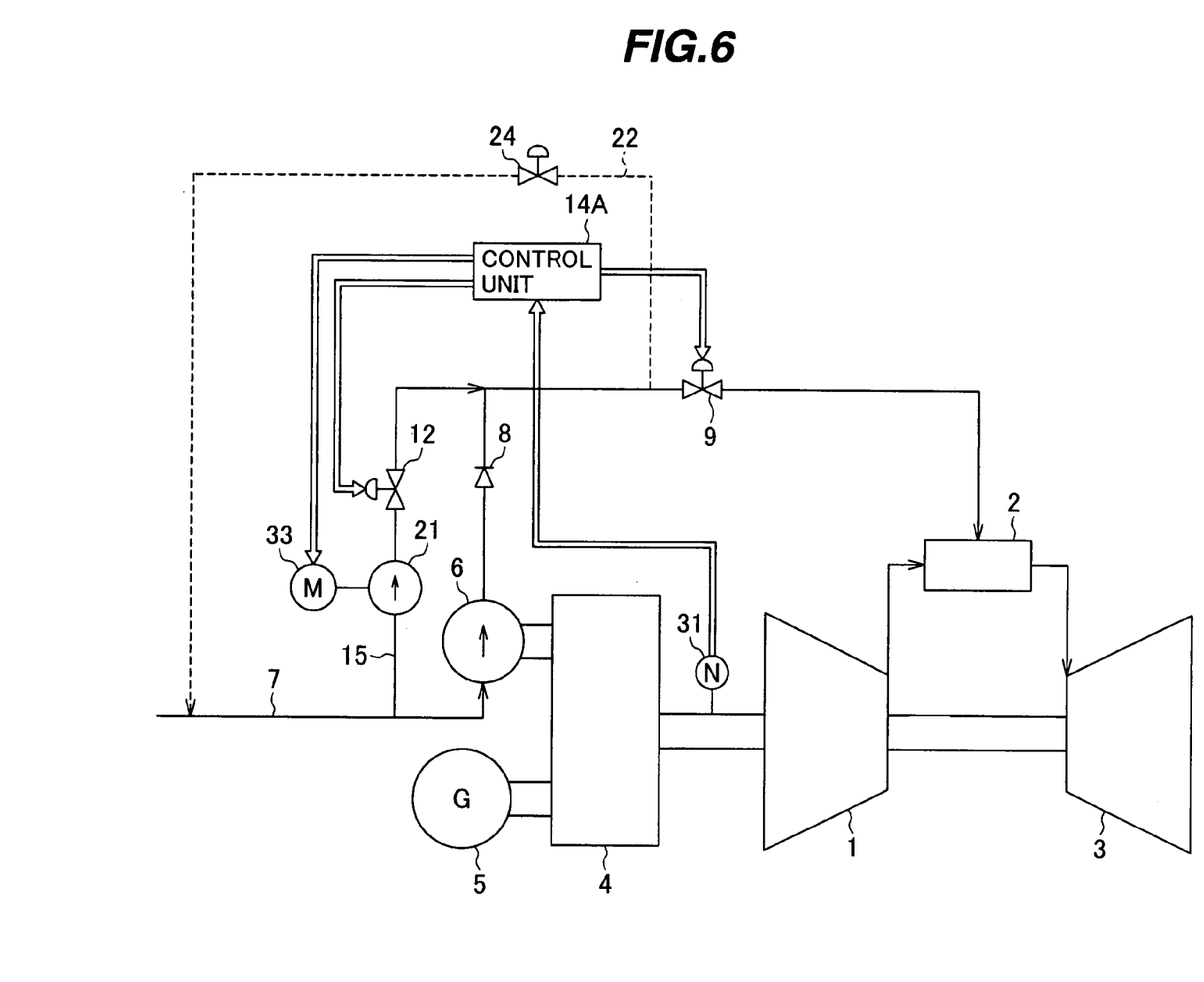
FIG. 6 is a detailed system diagram of a gas-turbine power generating installation according to a second embodiment of the present invention.

FIG. 6 is a detailed system diagram of the gas-turbine power generating installation according to the second embodiment of the present invention. Note that, in FIG. 6, the same symbols as those in FIG. 4 denote the same components.

This embodiment is featured in that a startup (fuel gas) boosting compressor 21 and a motor 33 for driving the startup boosting compressor 21 are both disposed in the bypass line 15. In view of the case in which the pressure of fuel gas extracted from a gas field is so low that the fuel gas cannot be supplied to the combustor 2 by utilizing the bypass line 15 provided to supply the fuel gas for the startup as described above, the startup boosting compressor 21 employed only at the startup is disposed in the startup bypass line 15. Because the startup boosting compressor 21 is employed only for a short time at the startup, it is just required to have a small supply flow rate and a low delivery pressure. Correspondingly, the power required for the motor 33 is also smaller than the rated power of the above-mentioned boosting compressor 6. Further, the startup boosting compressor 21 has a small size and hence does not need a so large installation space.

Because the fuel is supplied only after the ignition rotation speed has been reached, a control unit 14A drives the motor 33 to operate the startup boosting compressor 21 after the ignition rotation speed has been reached. As an alternative, to shorten the startup time of the gas turbine, the operation of the startup boosting compressor 21 may be started in anticipation of a time required for the startup boosting compressor 21 to operate in a desired state. This modification enables the startup boosting compressor 21 to provide a required delivery pressure just at the time when the gas turbine reaches the ignition rotation speed. After the ignition of the combustor 2 and the speed increasing stage of the gas turbine, when the delivery pressure of the fuel gas boosting compressor 6 rises to a level sufficient for allowing the fuel to be supplied to the combustor as described above, the control unit 14A closes the startup fuel supply valve 12 to stop the fuel supply via the startup bypass line 15 and also stops the startup boosting compressor 21, while the fuel supply is started via the normal fuel gas supply line in which the fuel gas boosting compressor 6 is disposed. As a result, since the fuel can be supplied at a sufficient pressure level to the gas turbine at the startup thereof, the gas turbine can be started up with high reliability without a failure such as misfire of the combustor.

According to this second embodiment, as described above, even when the pressure of the gas extracted from the outrage gas field is even lower, it is possible to start up the gas turbine by using the startup boosting compressor and to effectively utilize the gas that has been left unused in the past.

The detailed construction of a gas-turbine power generating installation according to a third embodiment of the present invention will be described below with reference to FIG. 7.

Figure 7:
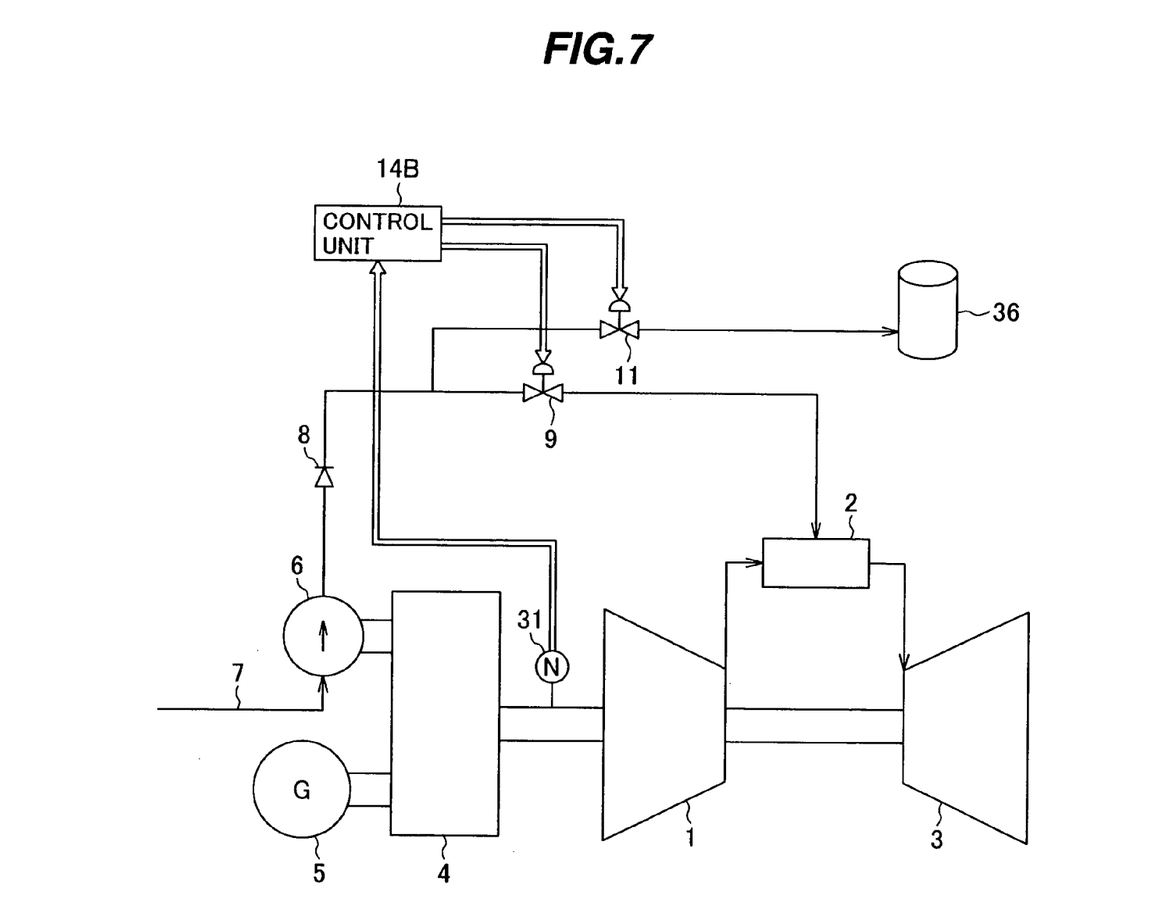
FIG. 7 is a detailed system diagram of a gas-turbine power generating installation according to a third embodiment of the present invention.

FIG. 7 is a detailed system diagram of the gas-turbine power generating installation according to the third embodiment of the present invention. Note that, in FIG. 7, the same symbols as those in FIG. 4 denote the same components.

This embodiment includes a tank 36 and an on/off valve (fuel gas supply switching valve) 11 disposed in a line between the tank 36 and the boosting compressor 6. During the period from the startup of the gas turbine until it reaches the ignition rotation speed, the rotation speed of the gas turbine is increased by the driving motor, and hence the fuel supply to the gas turbine is not needed. During that period, therefore, the gas turbine is operated with the fuel flow adjusting valve 9 closed. In other words, the operation of the gas turbine is performed while the delivery side of the boosting compressor 6 for boosting the pressure of the fuel gas is in the shutoff state, thus resulting in such a problem from the viewpoint of component protection that the compressor temperature may rise excessively. This problem is attributable to that, because the boosting compressor 6 is coupled to the rotary shaft of the gas turbine, the boosting compressor which should be kept stopped is also rotated. Accordingly, during the period from the startup until the ignition rotation speed is reached, a control unit 14B opens the on/off valve 11 and connects the delivery line of the boosting compressor 6 to the tank 36 having a capacity that is relatively small, but is enough to store the fuel gas supplied from the boosting compressor 6, whereby the fuel gas is bled to the tank 36 for several minutes at the startup to protect the boosting compressor from the shutoff-state operation. When the gas turbine increases its speed and reaches the ignition rotation speed, the control unit 14B closes the on/off valve 11 connected to the tank 36 and simultaneously opens the fuel flow adjusting valve 9 connected to the combustor 2, whereupon the fuel gas is supplied to the combustor 2 for ignition. With the above-described control process, the boosting compressor 6 can be avoided from being operated in the shutoff state, and reliability in the operation can be improved.

According to this third embodiment, as described above, the shutoff-state operation can be avoided in addition to the advantages that, even when the pressure of the gas extracted from the outrage gas field is even lower, it is possible to start up the gas turbine by using the startup boosting compressor and to effectively utilize the gas that has been left unused in the past.

The detailed construction of a gas-turbine power generating installation according to a fourth embodiment of the present invention will be described below with reference to FIG. 8.

Figure 8:
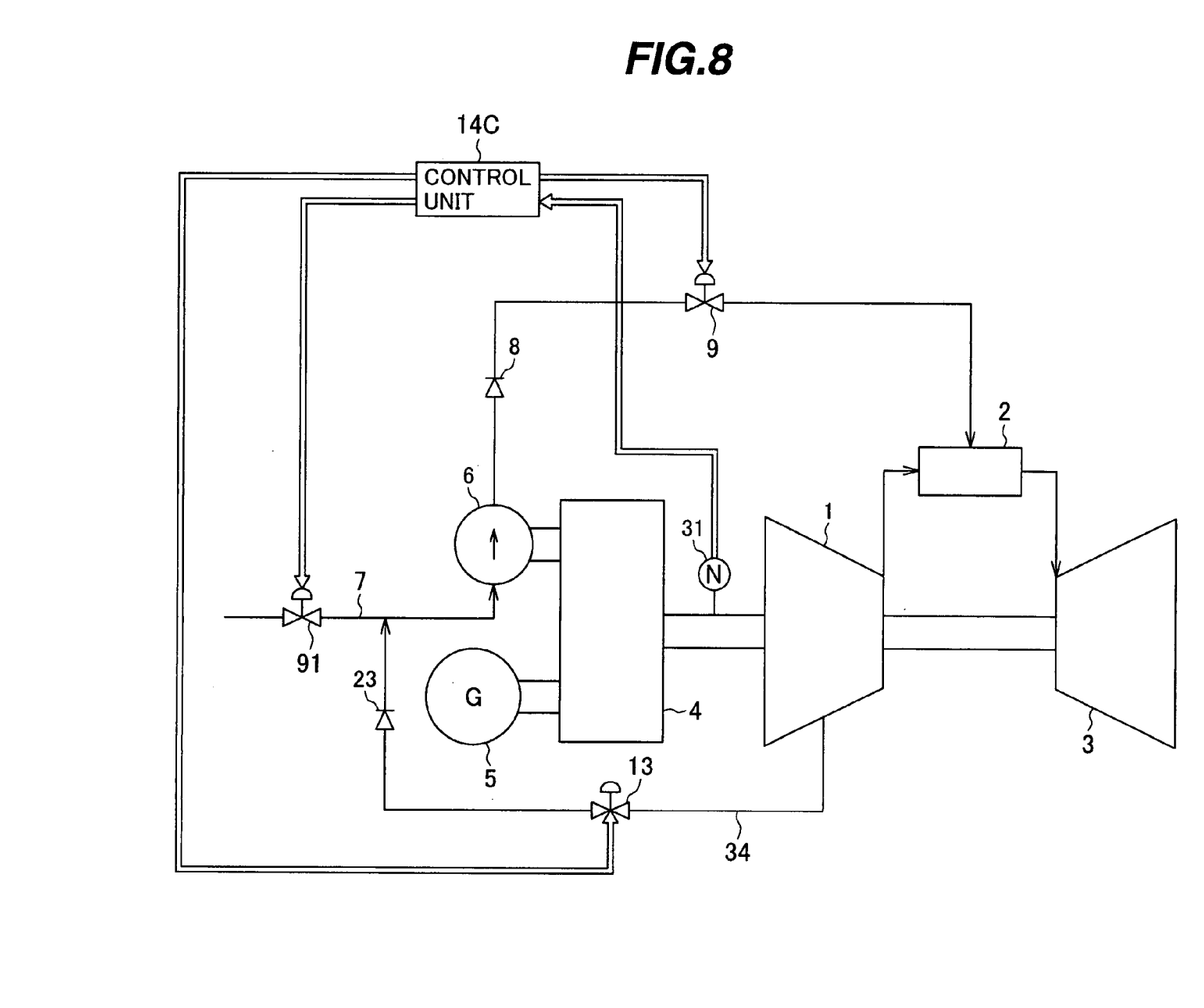
FIG. 8 is a detailed system diagram of a gas-turbine power generating installation according to a fourth embodiment of the present invention.

FIG. 8 is a detailed system diagram of the gas-turbine power generating installation according to the fourth embodiment of the present invention. Note that, in FIG. 8, the same symbols as those in FIG. 4 denote the same components.

This embodiment includes a switching valve 91 disposed in a line 7 for supplying fuel to the boosting compressor 6, and an air supply valve 13 and a check valve 23 both disposed in a line 34 connecting the delivery side of the gas turbine compressor 1 and the inlet side of the boosting compressor 6. To prevent the shutoff-state operation of the boosting compressor 6 described above with reference to FIG. 7, a control unit 14C closes the switching valve 91 disposed in the line 7 for supplying fuel to the boosting compressor 6 and opens the air supply valve 13 disposed in the line 34 so that air delivered or extracted from the gas turbine compressor 1 is supplied to the boosting compressor 6. As a result, the air is caused to flow into the combustor 2 at a flow rate required for protecting the boosting compressor 6. After the gas turbine has reached the ignition rotation speed, the control unit 14C closes the air supply valve 13, opens the switching valve 91, and adjusts the opening degree of the fuel flow adjusting valve 9 after opening it. Then, the supplied fuel is ignited and the fuel gas is supplied to the combustor 2 at a required flow rate, thereby increasing the rotation speed and the load. With the above-described control process, the boosting compressor 6 can be avoided from being operated in the shutoff state, and reliability in the operation can be improved.

According to this fourth embodiment, as described above, the shutoff-state operation can be avoided in addition to the advantages that, even when the pressure of the gas extracted from the outrage gas field is even lower, it is possible to start up the gas turbine by using the startup boosting compressor and to effectively utilize the gas that has been left unused in the past.

The embodiments of the present invention described above can provide the following advantages. In an outrage gas field where outturn is reduced, a difficulty occurs in obtaining a satisfactory profit from the economic point of view while maintaining the pipeline and the liquefying and transporting equipment which have been used so far. It is therefore economically advantageous to generate electric power using natural gas, which is produced in the outrage gas field, at the site of drilling and to transport the generated electric power to the consuming site without employing the pipeline and the liquefying and transporting equipment which have been used so far. By selling the generated electric power, the installation cost of a new power generating installation can be offset and a profit can be obtained.

Another advantage is that, because of the arrangement of transmitting the driving force from the gas turbine shaft to the fuel gas boosting compressor through the speed increasing gear, the boosting compressor can be constructed as a part of the gas turbine and the overall installation can be made compact. Also, because the boosting compressor is directly driven by the shaft torque of the gas turbine, a smaller loss and higher efficiency can be achieved as compared with the case of driving the boosting compressor by a motor or the like. Further, it is possible to effectively utilize the natural gas that is produced in small quantity and at low pressure and therefore has not been utilized in the past, by installing the gas turbine provided with the shaft-driven boosting compressor as an integral part of the gas turbine in the vicinity of the overage gas field, generating electric power, and supplying the generated electric power to the consuming site.

The fuel gas boosting compressor is driven in a directly coupled relation to the gas turbine shaft through the speed increasing gear, the power generator is driven in a directly coupled relation to the gas turbine shaft through the speed reducing gear, and the speed increasing gear and the speed reducing gear are both constructed integrally with the transmission. Accordingly, a compact gas turbine adaptable for the outrage gas field can be realized with high reliability and high efficiency. In a usual situation that the existing plant is present in an outrage gas field or an oil field and the gas-turbine power generating installation is installed there, the generating installation having a compact structure enables the existing site to be effectively utilized.

During the period from the startup of the gas turbine until it reaches the ignition rotation speed, the rotation speed of the gas turbine is increased by the driving motor, and hence the fuel supply to the gas turbine is not needed. During that period, therefore, the gas turbine is operated with the fuel flow adjusting valve fully closed. In other words, the operation of the gas turbine is performed while the delivery side of the boosting compressor for boosting the pressure of the fuel gas is in the shutoff state, thus resulting in a problem from the viewpoint of protection of the compressor components. To avoid that problem, the delivery line of the boosting compressor is connected to a small-sized tank and the fuel gas is bled to the tank for several minutes at the startup to protect the boosting compressor from the shutoff-state operation. When the gas turbine increases its speed and reaches the ignition rotation speed, the fuel gas supply switching valve is shifted to supply the fuel gas to the combustor for ignition. With that control process, the boosting compressor can be avoided from being operated in the shutoff state, an excessive rise of the fuel temperature can be prevented, and reliability in the operation is improved.

Alternatively, to prevent the shutoff-state operation of the boosting compressor, air delivered or extracted from the gas turbine compressor is supplied to the boosting compressor instead of using the above-mentioned tank. The air is caused to flow into the combustor at a flow rate required for protecting the boosting compressor. After the gas turbine has reached the ignition rotation speed, the air supply valve is closed, and the fuel flow adjusting valve is opened and adjusted in its opening degree. The supplied fuel is ignited and the fuel gas is supplied to the combustor at a required flow rate, thereby increasing the rotation speed and the load. With that control process, the boosting compressor can be avoided from being operated in the shutoff state, and reliability in the operation can be improved.

Further, in the startup stage in which the rotation speed of the gas turbine is low, the rotation speed of the boosting compressor is also low and a pressure loss is caused in excess of the boosting effect developed by the boosting compressor because the boosting compressor itself acts as a resistance member. Therefore, the delivery pressure of the boosting compressor may be often lower than the pressure of the extracted fuel gas. In such a case, there is a possibility that the fuel pressure is not sufficiently boosted and the required amount of fuel cannot be supplied to the combustor. In view of such a possibility, the bypass line is provided to supply the fuel gas to the combustor while bypassing the boosting compressor. During a period of the low-speed operation at the startup from the ignition rotation speed until the delivery pressure of the boosting compressor rises up to a certain level, the fuel is supplied via the bypass line, and highly reliable operation can be realized.

When the pressure of fuel gas extracted from a gas field is so low that the fuel gas cannot be supplied to the combustor by utilizing the bypass line provided to supply the fuel gas for the startup as mentioned above, the startup boosting compressor employed only at the startup is disposed in the startup bypass line. This arrangement enables the fuel to be sufficiently supplied at the startup even when the pressure of the extracted fuel gas is low.

Further, during the speed increasing stage or the low-load operation of the gas turbine, the flow rate of the fuel supplied to the combustor is relatively small. Therefore, the operation may come into a surge region depending on pressure and flow rate characteristics of the boosting compressor. The anti-surge line is provided to prevent the operation of the boosting compressor in the surge region. By ensuring a sufficient flow rate of the fuel by using the anti-surge line, stable operation can be realized over a full range from the startup to the rated-load operation of the gas turbine.

Thus, low-pressure fuel gas which is produced from an overage gas field and which has not been effectively used in the past can be employed to generate electric power with the gas turbine by employing an installation in which the power generator and the boosting compressor are constructed integrally with the transmission. As a result, it is possible to overcome the problems caused in the startup stage when natural gas produced at low pressure in the outrage gas field is used.

What is claimed is:

1. A gas-turbine power generating installation including a gas turbine installed in the vicinity of an overage gas field or an oil field and generating electric power with said gas turbine by using natural gas produced in the overage gas field or accompanying gas produced in the oil field, the generated electric power being supplied to a consuming site, wherein said gas turbine is a gas turbine in which air compressed by a compressor is introduced to a combustor for combustion after being mixed with fuel, a turbine is driven by generated combustion gas, and a power generator is driven by motive power obtained from a rotary shaft of said gas turbine, said installation further includes a boosting compressor driven by the motive power obtained from the rotary shaft of said gas turbine, and the natural gas or the accompanying gas is boosted in pressure by said boosting compressor and supplied as fuel to said combustor, wherein said power generator is driven by the rotary shaft of said gas turbine through a speed reducing gear, and said boosting compressor is driven by the rotary shaft of said gas turbine through a speed increasing gear.

2. A gas-turbine power generating installation according to claim 1, wherein said speed reducing gear and said speed increasing gear receiving the motive power from the shaft of said gas turbine on the compressor side.

3. A gas-turbine power generating installation including a gas turbine installed in the vicinity of an overage gas field or an oil field and generating electric power with said gas turbine by using natural gas produced in the overage gas field or accompanying gas produced in the oil field, the generated electric power being supplied to a consuming site, wherein said gas turbine is a gas turbine in which air compressed by a compressor is introduced to a combustor for combustion after being mixed with fuel, a turbine is driven by generated combustion gas, and a power generator is driven by motive power obtained from a rotary shaft of said gas turbine, said installation further includes a boosting compressor driven by the motive power obtained from the rotary shaft of said gas turbine, and the natural gas or the accompanying gas is boosted in pressure by said boosting compressor and supplied as fuel to said combustor, said gas-turbine power generating installation further including:

a fuel flow adjusting valve disposed in a line extending from an outlet of said boosting compressor to said combustor in said gas turbine;

a tank;

a line connecting an intermediate point between the outlet of said boosting compressor and said fuel flow adjusting valve to said tank; and an on/off valve disposed in the line connected to said tank.

4. A gas-turbine power generating installation including a gas turbine installed in the vicinity of an overage gas field or an oil field and generating electric power with said gas turbine by using natural gas produced in the overage gas field or accompanying gas produced in the oil field, the generated electric power being supplied to a consuming site, wherein said gas turbine is a gas turbine in which air compressed by a compressor is introduced to a combustor for combustion after being mixed with fuel, a turbine is driven by generated combustion gas, and a power generator is driven by motive power obtained from a rotary shaft of said gas turbine, said installation further includes a boosting compressor driven by the motive power obtained from the rotary shaft of said gas turbine, and the natural gas or the accompanying gas is boosted in pressure by said boosting compressor and supplied as fuel to said combustor, said gas-turbine power generating installation further including:

an air line extending from an outlet or an intermediate position of said compressor in said gas turbine to an inlet of said boosting compressor;

an air supply valve disposed in said air line; and a switching valve disposed on the inlet side of said boosting compressor upstream of a joint position of said air line.

5. A gas-turbine power generating installation including a gas turbine installed in the vicinity of an overage gas field or an oil field and generating electric power with said gas turbine by using natural gas produced in the overage gas field or accompanying gas produced in the oil field, the generated electric power being supplied to a consuming site, wherein said gas turbine is a gas turbine in which air compressed by a compressor is introduced to a combustor for combustion after being mixed with fuel, a turbine is driven by generated combustion gas, and a power generator is driven by motive power obtained from a rotary shaft of said gas turbine, said installation further includes a boosting compressor driven by the motive power obtained from the rotary shaft of said gas turbine, and the natural gas or the accompanying gas is boosted in pressure by said boosting compressor and supplied as fuel to said combustor, said gas-turbine power generating installation further including:

a bypass line connecting an inlet and an outlet of said boosting compressor in said gas turbine;

a startup fuel gas supply valve disposed in said bypass line; and pressure gauges for measuring an inlet pressure and an outlet pressure of said boosting compressor.

6. A gas-turbine power generating installation including a gas turbine installed in the vicinity of an overage gas field or an oil field and generating electric power with said gas turbine by using natural gas produced in the overage gas field or accompanying gas produced in the oil field, the generated electric power being supplied to a consuming site, wherein said gas turbine is a gas turbine in which air compressed by a compressor is introduced to a combustor for combustion after being mixed with fuel, a turbine is driven by generated combustion gas, and a power generator is driven by motive power obtained from a rotary shaft of said gas turbine, said installation further includes a boosting compressor driven by the motive power obtained from the rotary shaft of said gas turbine, and the natural gas or the accompanying gas is boosted in pressure by said boosting compressor and supplied as fuel to said combustor, said gas-turbine power generating installation further including:

a bypass line connecting an inlet and an outlet of said boosting compressor in said gas turbine;

a startup fuel gas supply valve disposed in said bypass line; and a tachometer for detecting a rotation speed of a shaft of said boosting compressor, said turbine or said power generator.

7. A gas-turbine power generating installation including a gas turbine installed in the vicinity of an overage gas field or an oil field and generating electric power with said gas turbine by using natural gas produced in the overage gas field or accompanying gas produced in the oil field, the generated electric power being supplied to a consuming site, wherein said gas turbine is a gas turbine in which air compressed by a compressor is introduced to a combustor for combustion after being mixed with fuel, a turbine is driven by generated combustion gas, and a power generator is driven by motive power obtained from a rotary shaft of said gas turbine, said installation further includes a boosting compressor driven by the motive power obtained from the rotary shaft of said gas turbine, and the natural gas or the accompanying gas is boosted in pressure by said boosting compressor and supplied as fuel to said combustor, said gas-turbine power generating installation further including:

a bypass line connecting an inlet and an outlet of said boosting compressor in said gas turbine; and a startup fuel gas boosting compressor and a startup fuel gas supply valve both disposed in said bypass line.

8. A gas-turbine power generating installation including a gas turbine installed in the vicinity of an overage gas field or an oil field and generating electric power with said gas turbine by using natural gas produced in the overage gas field or accompanying gas produced in the oil field, the generated electric power being supplied to a consuming site, wherein said gas turbine is a gas turbine in which air compressed by a compressor is introduced to a combustor for combustion after being mixed with fuel, a turbine is driven by generated combustion gas, and a power generator is driven by motive power obtained from a rotary shaft of said gas turbine, said installation further includes a boosting compressor driven by the motive power obtained from the rotary shaft of said gas turbine, and the natural gas or the accompanying gas is boosted in pressure by said boosting compressor and supplied as fuel to said combustor, said gas-turbine power generating installation further including:

an anti-surge line extending to an inlet of said boosting compressor from an intermediate point of a line extending from an outlet of said boosting compressor to said combustor in said gas turbine; and an anti-surge valve disposed in said anti-surge line.

* * * * *